United States Patent [19]

Hain et al.

[11] Patent Number: 4,807,439

[45] Date of Patent: Feb. 28, 1989

[54] EXHAUST GAS SYSTEM WITH SILENCER FOR A TURBOCHARGED INTERNAL COMBUSTION ENGINE

[75] Inventors: Klaus Hain, Leonberg; Klaus-Peter Bessing, Ditzingen; Claus Bruestle, Heimsheim, all of Fed. Rep. of Germany

[73] Assignee: Dr. Ing. h.c.F. Porsche AG, Stuttgart, Fed. Rep. of Germany

[21] Appl. No.: 201,930

[22] Filed: Jun. 3, 1988

[30] Foreign Application Priority Data

Jun. 5, 1987 [DE] Fed. Rep. of Germany ....... 3718875

[51] Int. Cl.$^4$ ............................................. F02B 37/12
[52] U.S. Cl. ..................................... 60/602; 181/252; 181/262

[58] Field of Search ................ 60/600, 601, 602, 603; 181/252, 262

[56] References Cited

FOREIGN PATENT DOCUMENTS 2110755  6/1983  United Kingdom ................ 60/602

*Primary Examiner*—Michael Koozo
*Attorney, Agent, or Firm*—Barnes & Thornburg

[57] ABSTRACT

An exhaust gas system with a silencer for an internal combustion engine supercharged by a turbocharger includes a main line leading to the turbine of the turbocharger and a bypass line bypassing the turbine. The main line and the bypass line terminate in the silencer aligned to one another in such a manner that the exhaust gas flow of the main line exerts an ejector action on the exhaust gas flow of the bypass line.

15 Claims, 2 Drawing Sheets

EXHAUST GAS SYSTEM WITH SILENCER FOR A TURBOCHARGED INTERNAL COMBUSTION ENGINE

BACKGROUND AND SUMMARY OF THE INVENTION

The present invention relates to an exhaust gas installation with muffler or silencer for a turbocharged reciprocating piston internal combustion engine in which the exhaust gas line consists of a main line leading to the turbine of the turbocharger and of a bypass line bypassing the turbine and controlled by a bypass valve.

In an exhaust gas installation as is schematically illustrated in the patent application No. P 37 15 061.8, the exhaust gases of the main line and of the bypass line are combined in a silencer or muffler before they reach the atmosphere. If an internal combustion engine equipped with such an exhaust gas installation is to operate optimally as aircraft engine at different geodetic heights, then the intensity of the bypass flow to the main flow must have in each case a corresponding ratio. The location in the muffler or silencer where the exhaust gas flows from the main line and from the bypass line mix, must be so constructed that a low-loss mixing can take place which is as noiseless as possible.

It is the object of the present invention to improve the overall efficiency of the internal combustion engine and to dampen effectively the exhaust gas noises by a particular construction of the exhaust gas system and especially of the muffler or silencer installed into the same.

The underlying problems are solved according to the present invention in that the main line and the bypass line terminate in the housing of the muffler or silencer so aligned to one another that the exhaust gas flow of the main line exerts an ejector effect on the exhaust gas flow of the bypass line. If the exhaust gas of the by pass line is admixed to the exhaust gas flow in the main line by ejector action, the mixing takes place in the turbulent edge area of the free jet produced by the main flow. The turbulences and flow losses can be kept small in this manner. The overall efficiency of the internal combustion engine is increased. At the same time, an effective damping of the exhaust gas noises is attained by the ejector-admixing in the muffler or silencer. For that purpose, the main line is connected to a central pipe or tubular member secured in the housing of the muffler or silencer, from which the exhaust gas exits as free jet. The bypass flow is blown into an opening surrounding this free jet. Additionally, the suction of the free jet acts on the by-pass flow and effects its mixing with the turbulent edge air zone of the free jet without the occurrence of larger flow losses.

For purposes of regaining pressure and therewith for increasing the efficiency of the turbine, the central pipe is widened diffusor-like in the flow direction; the lead angle amounts to about 4°. For purposes of noise reduction the bypass flow is introduced strongly throttled into an annular space of the silencer or muffler housing surrounding the central pipe and reaches from there the opening.

The noise of the main and bypass flow is dampened in common in a nozzle pipe coaxial to the central pipe which is provided with a large number of radial bores and is surrounded with a packing of damping-wool.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention and wherein.

DETAILED DESCRIPTION OF THE DRAWINGS

Figure 1:
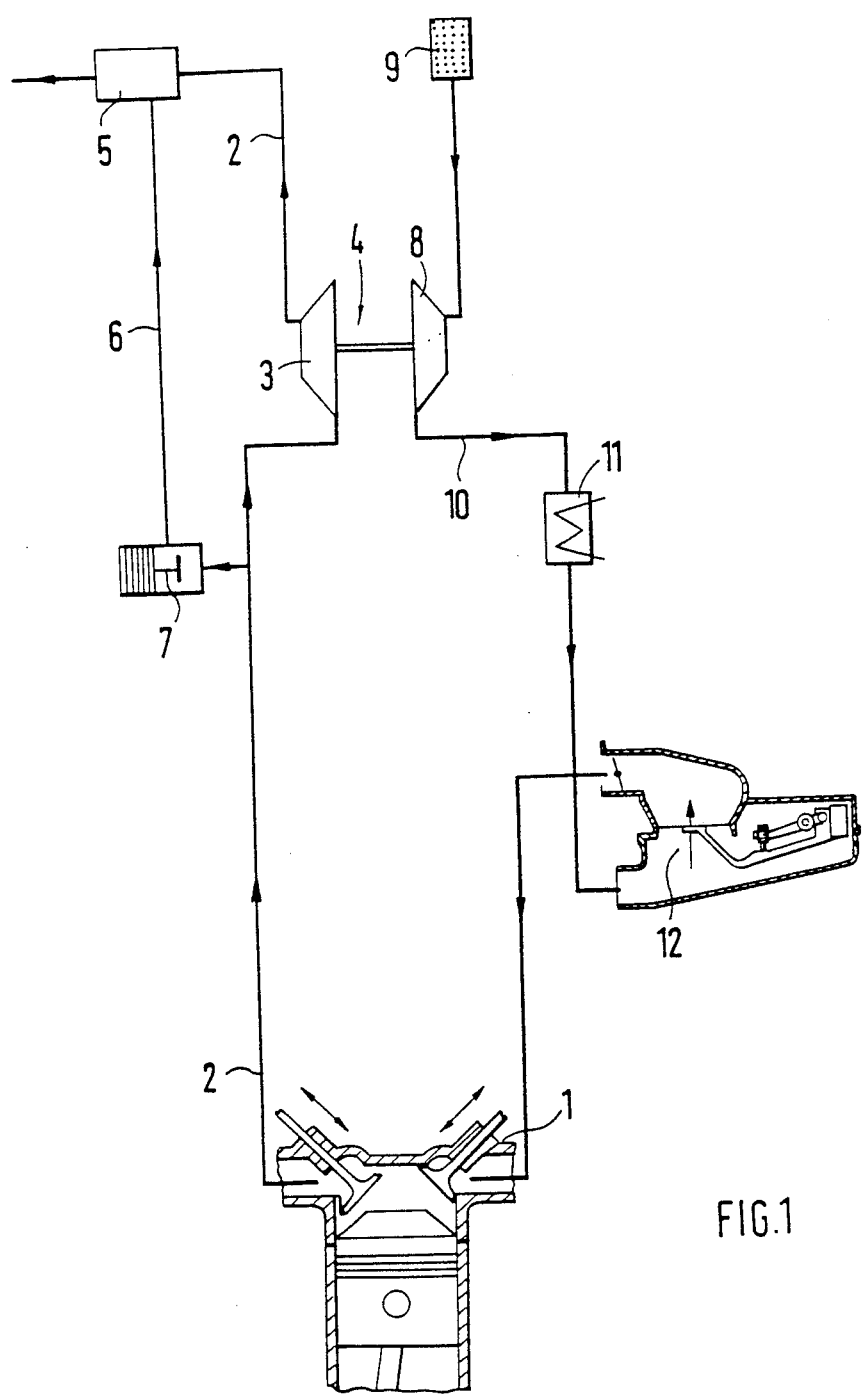
FIG. 1 is a schematic view of an internal combustion engine with an exhaust gas turbocharger in accordance with the present invention.

Referring now to the drawing wherein like reference numerals are used throughout the various views to designate like parts, a main line 2 for exhaust gases leads from a cylinder head 1 of a reciprocating piston internal combustion engine to the turbine 3 of a turbocharger generally designated by reference numeral 4 and from there into the atmosphere after flowing through a muffler or silencer 5. A bypass line 6 is disposed in parallel to the turbine 3 which also terminates in the muffler 5. The bypass flow mixes with the exhaust gas flow of the main line 2 in the muffler or silencer 5. A bypass valve 7 is interconnected into the bypass line 6 by way of which, depending on its position, more or less exhaust gas reaches the muffler or silencer 5 without acting on the turbine 3.

The turbine 3 drives a compressor 8, by means of which fresh air is sucked in by way of an air filter 9 and is fed under pressure increase into a charging air line 10. The charging air line 10 leads by way of a charging air cooler 11 to an air quantity measuring device 12 controlling the injection system and from there to the cylinder head 1 of the internal combustion engine.

The greater the volumetric flow of the exhaust gases acting upon the turbine, the higher is the rotational speed and the output of the compressor. With the increase of the compressor output, the volumetric flow and the pressure of the charging air supplied by the same also increases. The attainable charging pressure is also dependent on how high the atmospheric pressure of the fresh air entering into the compressor is. As this feed pressure decreases with increasing geodetic height, the charging pressure would also be correspondingly reduced. In order to prevent the same, the bypass valve is increasingly closed with increasing geodetic height at which the internal combustion engine finds itself. The through-flow ratio of the bypass line to the main line which amounts at sea level to about 45% to 55%, is reduced at maximum geodetic height to 0% to 10%.

Figure 2:
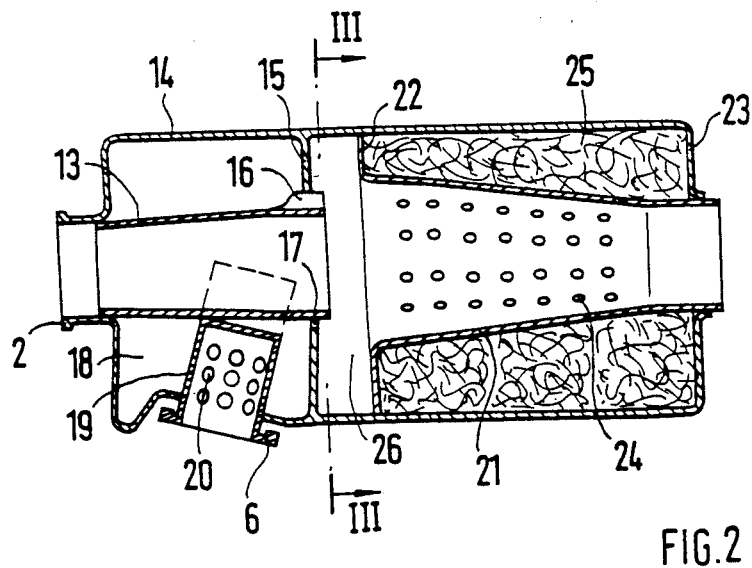
FIG. 2 is a longitudinal cross-sectional view through an exhaust gas muffler or silencer in accordance with the present invention.
Figure 3:
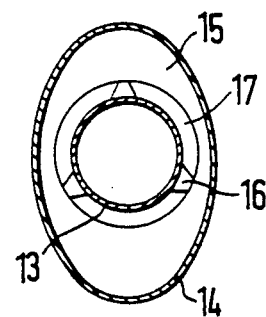
FIG. 3 is a cross-sectional view through the muffler or silencer taken along line III—III of FIG. 2.

Constructive measures for increasing the turbine efficiency and therewith the overall efficiency of the internal combustion engine are realized in connection with the muffler or silencer illustrated in FIGS. 2 and 3. The main line 2 coming from the turbine 3 is connected to a central pipe or tubular member 13 which is secured at its upstream end at the housing 14 of the silencer or muffler 5. At the other end, the central pipe 13 extends through a partition wall 15 of the housing 14 and is retained in the same by means of three radially projecting nubs 16. Three through-flow areas of an insert opening 17 are located between the nubs 16 (FIG. 3).

The end 19 of the bypass line 6 protrudes into an annular space 18 located between the central pipe 13 and the inner wall of the housing 14 and is secured in the casing of the housing 14. The end 19 of the by-pass line 6 is closed off at its end-face; it is provided along its circumference with radial bores 20 through which the bypass flow enters into the annular space 18 throttled and sound-dampened.

A tubular nozzle member 21 is secured in the housing 14 coaxially to the central pipe by means of a collar 22 and is extended at the downstream end 23 out of the housing 14 into the atmosphere. The tubular nozzle member 21 is provided along its outer surface with a pattern of equidistant bores 24. The intermediate space between the tubular nozzle member 21 and the inner wall of the housing 14 is filled out with damping wool 25.

The exhaust gas exits out of the central tubular member or pipe 13 and induces along by ejector action the bypass flow flowing out of the annular space 18 by way of the openings 17. A mixing of the two exhaust gas flows takes place in the annularly shaped mixing space 26 located between the partition wall 15 and the collar 22 of the tubular nozzle member 21. Upon entry of this common exhaust gas flow into the tubular nozzle member 21, the largest part of its sound energy is introduced by way of the bores 24 into the damping wool 25 and is absorbed by the same.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An exhaust gas installation, comprising silencer means having a housing means for a reciprocating piston internal combustion engine supercharged by a turbocharger means, exhaust gas line means including a main line leading to the turbine of the turbocharger means and a bypass line bypassing the turbine and controlled by a bypass valve means, and the main line and the bypass line terminating in the housing means directed to one another in such a manner that the exhaust gas flow of the main line exerts an ejector effect on the exhaust gas flow of the bypass line.

2. An exhaust gas installation means according to claim 1, wherein the main line terminates in a housing-fixed central tubular member and the bypass line terminates in an annular space located between the central tubular member and the inner wall of the housing means, the annular space being in operative communication with a substantially coaxial, housing-fixed tubular nozzle means by way of an opening means surrounding the exit end of the central tubular member.

3. An exhaust gas installation means according to claim 2, wherein a free annularly shaped mixing space extending up to the inner wall of the housing means is present between the opening means and the tubular nozzle means.

4. An exhaust gas line means according to claim 2, wherein the central tubular member is widened diffusor-like in the flow direction.

5. An exhaust gas line means according to claim 2, wherein the tubular nozzle means is provided peripherally with a large number of radial apertures which are covered off by damping material disposed between the tubular nozzle means and the inner wall of the housing means.

6. An exhaust gas line means according to claim 5, wherein the apertures are constructed as equally large, equi-distant bores which extend over a large part of the length of the tubular nozzle means.

7. An exhaust gas installation means according to claim 6, wherein the housing means has an elliptical cross section.

8. An exhaust gas installation means according to claim 2, wherein the end of the bypass line protruding into the annular space of the housing means is closed off at the end and is provided circumferentially along its outer surface with radial bores.

9. An exhaust gas installation means according to claim 1, wherein the rate of flow ratio of the bypass line to the main line is reduced with increasing geodetic height of the internal combustion engine by closing the bypass valve means.

10. An exhaust gas line means according to claim 3, wherein the central tubular member is widened diffusor-like in the flow direction.

11. An exhaust gas line means according to claim 10, wherein the tubular nozzle means is provided peripherally with a large number of radial apertures which are covered off by damping material disposed between the tubular nozzle means and the inner wall of the housing means.

12. An exhaust gas line means according to claim 11, wherein the apertures are constructed as equally large, equi-distant bores which extend over a large part of the length of the tubular nozzle means.

13. An exhaust gas installation means according to claim 1, wherein the housing means has an elliptical cross section.

14. An exhaust gas installation means according to claim 11, wherein the end of the bypass line protruding into the annular space of the housing means is closed off at the end and is provided circumferentially along its outer surface with radial bores.

15. An exhaust gas installation means according to claim 11, wherein the rate of flow ratio of the bypass line to the main line is reduced with increasing geodetic height of the internal combustion engine by closing the bypass valve means.

* * * * *